M. H. COLLINS.
Lamp-Chimney and Burner.

No. 126,184.  
5 Sheets--Sheet 1.  
Patented April 30, 1872.

Witnesses.  
Simon W. Hathaway  
Charles A. Phillips

Inventor.  
M. H. Collins

M. H. COLLINS.
Lamp-Chimney and Burner.
No. 126,184.  Patented April 30, 1872.
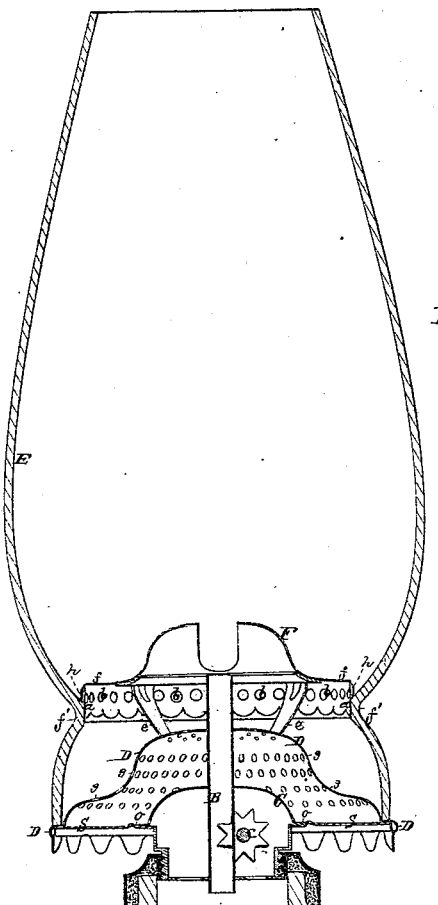
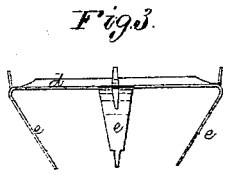
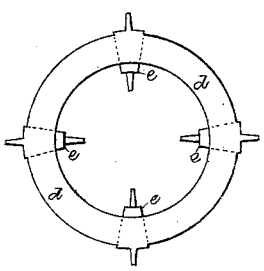
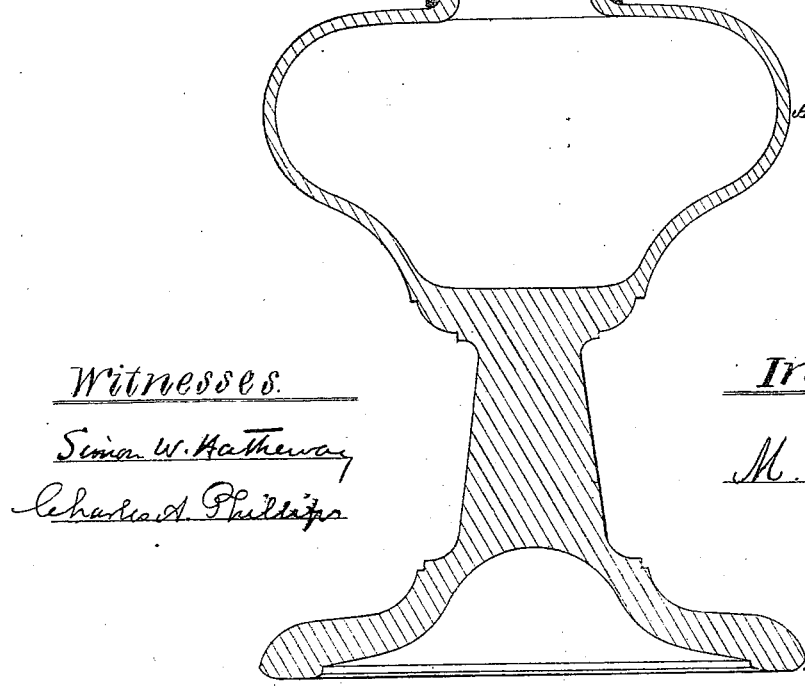
Witnesses.
Simon W. Hathaway
Charles A. Phillips
Inventor
M. H. Collins M. H. COLLINS.
Lamp-Chimney and Burner.
No. 126,184.  
Patented April 30, 1872.
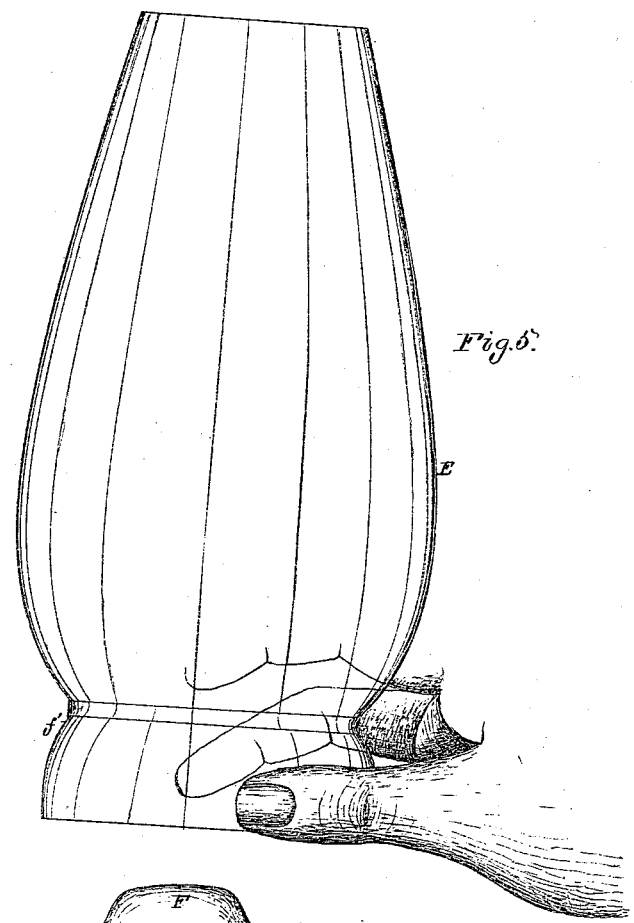
Fig. 5.
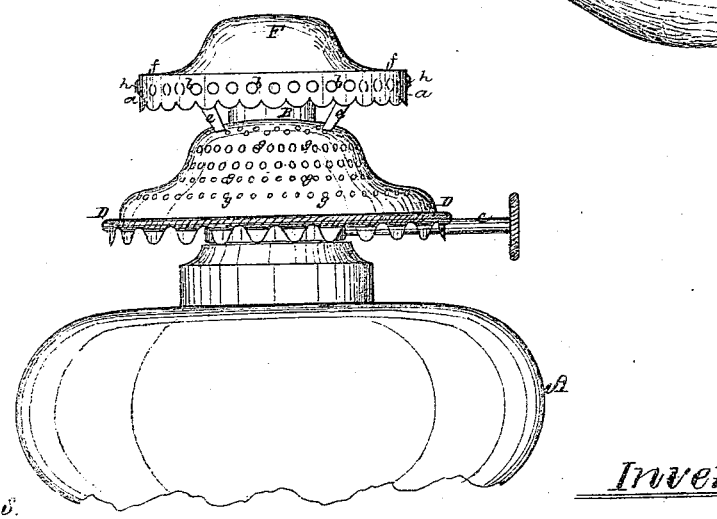
Witnesses.  
Simon W. Hatheway  
Charles A. Phillips
Inventor.  
M. H. Collins M. H. COLLINS.
Lamp-Chimney and Burner.
No. 126,184.          Patented April 30, 1872.
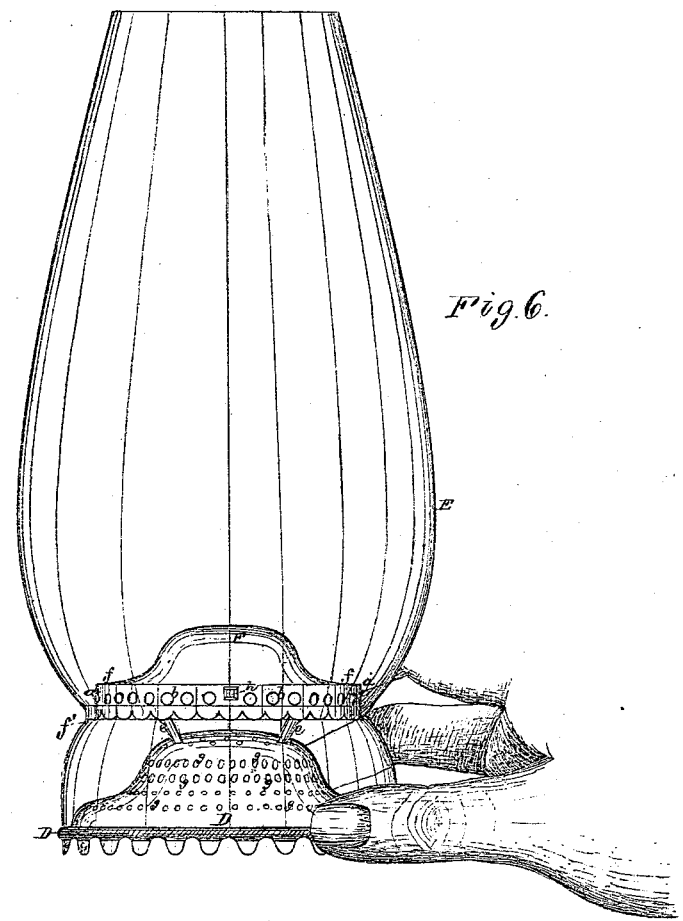
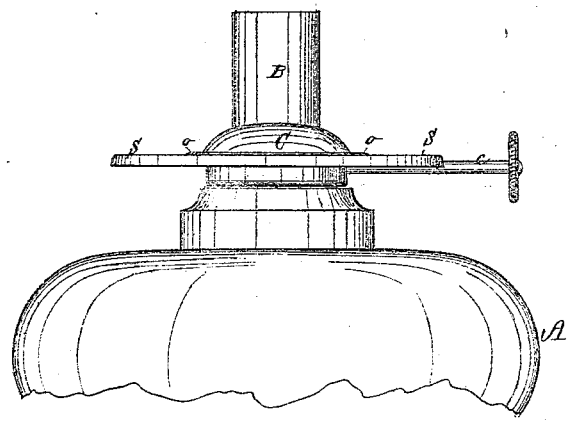
Witnesses
Simon W. Hathaway
Charles A. Phillips
Inventor.
M. H. Collins M. H. COLLINS.
Lamp-Chimney and Burner.

No. 126,184.                         Patented April 30, 1872.

Witnesses.
Simon W. Hatheway
Charles A. Phillips

Inventor.
M. H. Collins

126,184

UNITED STATES PATENT OFFICE.

MICHAEL H. COLLINS, OF CHELSEA, MASSACHUSETTS.

IMPROVEMENT IN LAMP-CHIMNEYS AND BURNERS.

Specification forming part of Letters Patent No. 126,184, dated April 30, 1872.

*To all whom it may concern:*

Be it known that I, MICHAEL H. COLLINS, of Chelsea, in the county of Suffolk and State of Massachusetts, have invented certain new and useful Improvements in Lamps, of which the following is a specification:

The principal object of my invention is to produce a simple, compact, and effective lamp, by which not only a most thorough and perfect combustion of the fluid used in the generation of light is attained and the maximum amount of the light produced utilized, but a simple and ready means secured of confining the chimney upon its rest or supporter; and my invention consists mainly of so constructing the base of the elevated cone, or a flanch depending therefrom, as to extend up into the throat of a chimney formed with a contracted neck, and by impinging against the circular or ground perimeter thereof maintain the chimney upon its rest or supporter without the use of a spring, spring-catch, or other device heretofore employed.

To enable others skilled in the art to make and use my invention, I will now proceed to describe the manner in which the same is or may be carried into effect by reference to the accompanying drawing, in which—

Figure 1:
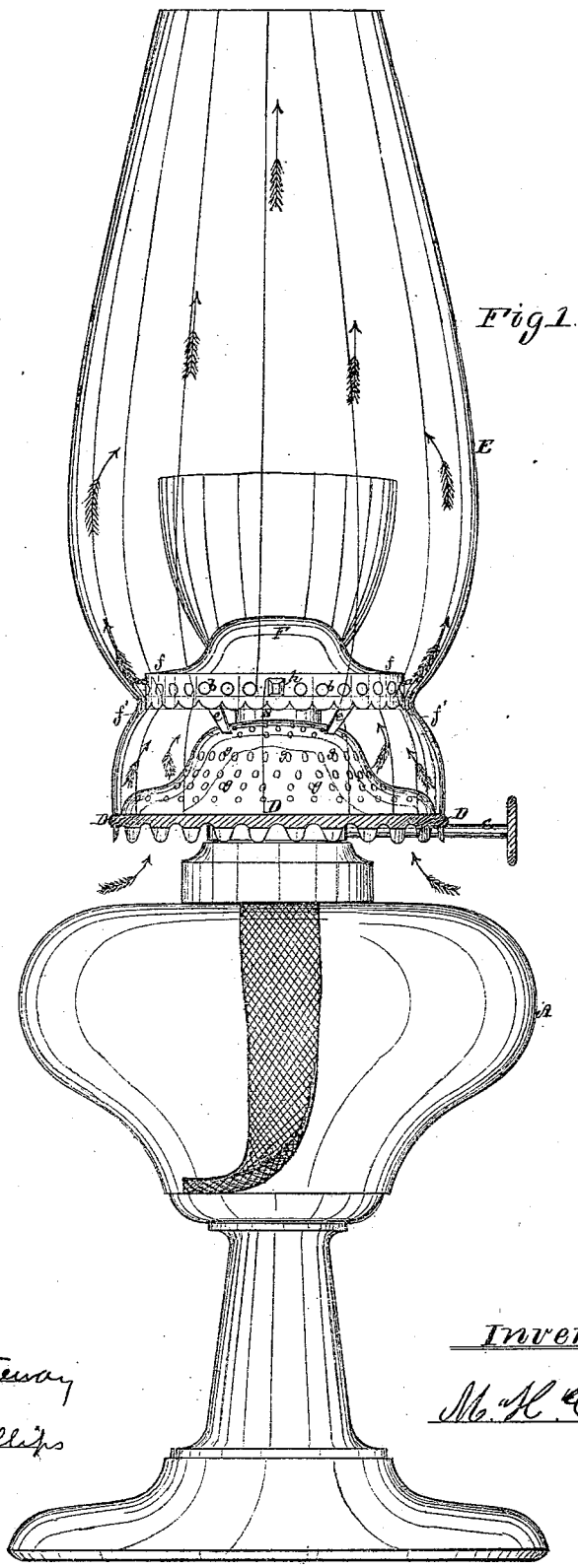
Figure 7:
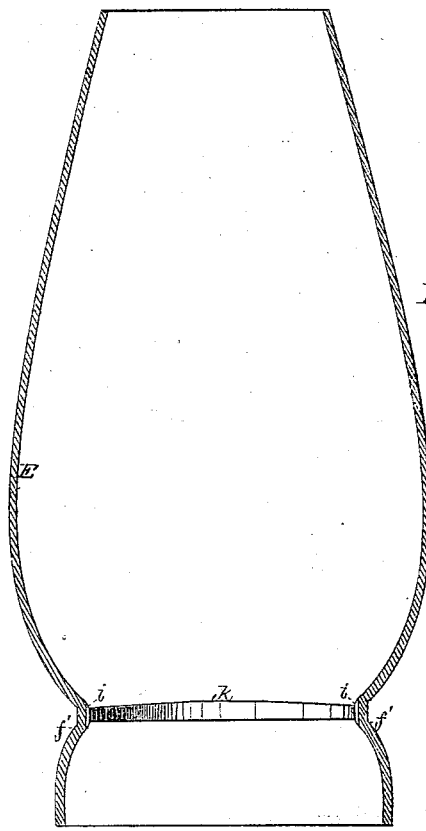
Figure 8:
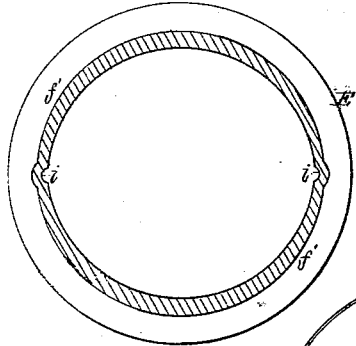
Figure 9:
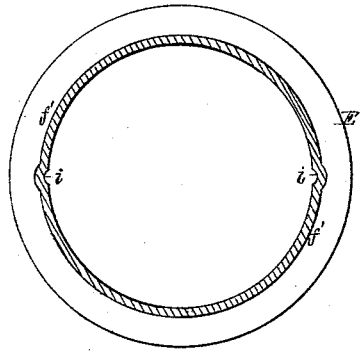
Figure 10:
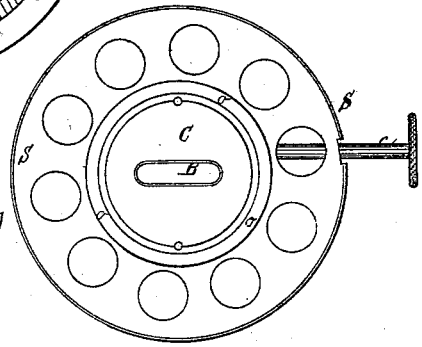

Figure 1 denotes a side elevation of a lamp constructed in accordance with my invention. Fig. 2 is a vertical and central section of the same. Figs. 3 and 4 are side and top views of the cone-supporting annulus and its series of arms. Fig. 5 is a side elevation of the lamp, showing the chimney as removed from the burner. Fig. 6 is a similar view, representing the chimney with the elevated cone and its co-operative parts as removed from the wick-tube, and the auxiliary or base chimney-supporter. Fig. 7 is a vertical and longitudinal section of the chimney. Fig. 8 is a top view of the chimney, showing the perimeter of the throat as it appears when it comes from the mold or as ordinarily constructed. Fig. 9 is a similar view as it appears when "ground" or finished. Fig. 10 is a top view of the lower portion of the burner, consisting of the auxiliary chimney-supporter, the wick-tube, and the wick-adjusting device.

In the said drawing, A denotes the lamp-body or reservoir for holding the kerosene oil or fluid used for the generation of light. B is the wick-tube, which passes through and is fastened to a hollow cap, C, screwed into the neck of the reservoir, or an annular metallic cap affixed to the said neck. *o* is an annular groove formed around the top of the cap C, the same serving to intercept any oil which may run down the wick-tube, such groove being provided with orifices by which the oil is conveyed into the chamber of the cap, from whence, by means of holes formed in the bottom thereof, the oil is returned back into the oil-reservoir. A shaft, *c*, extends transversely through the cap C, and carries one or more toothed wheels to enter the wick-tube, (and wick when therein,) and serves, when revolved by the shaft, to either raise or lower the wick, as circumstances may require. Concentric with the cap C, and extending from and affixed to it, or extending from or affixed to the wick-tube, is a perforated disk or shelf, S, having the form in top view as shown in Fig. 10. On this base or auxiliary chimney-supporter the main chimney-supporter D is disposed or rests. The said part D encompasses and slips on the wick-tube B, and is bell-shaped or concavo-convex, so as to extend up into the chimney when resting on it at or near its base. The chimney may embrace the part D and rest directly upon the part S; but I prefer to locate it upon the part D, which I form foraminous, or provide with a series of air-passages, *g g*, so arranged as to cause air, while the lamp is in operation, to pass through them and against the inner surface of the lower portion of the glass chimney or that part thereof which is below the air-deflector or cone F and its flanch *a*, and this preparatory to such air either in part or in whole being made to pass through the flame-passage or the series of air-inducts *b b*, formed around the base of the cone or its flanch, as seen in Figs. 1, 2, 5, and 6. The air which is thus caused to flow against the lower part of the chimney serves to aid in keeping it at a low temperature, while the series of inducts disposed on the perimeter of the flanch serves to deflect the currents of air outwardly against the inner surface of that part of the chimney which is above the same or the throat of the chimney, and maintain the same in such a cool state as to enable the chimney at such part, when the lamp is in operation, to be grasped with impunity by the hand of a person. One advantage of this elevation of the chimney-rest or part D up within the chimney, in manner as described and represented, is that it operates as a deflector to disperse through the sides of the glass chimney the rays of light which may fall upon the elevated surface of part D; its peculiar formation also serves to deflect outwardly any dirt or carbonaceous matter which may fall from the wick. The main cone or deflector F is disposed over the part D and the wick-tube, and is supported in position by means of a series of arms, e e, depending from an annulus, d, which is affixed to the under surface of the cone, as shown in Fig. 2, the lower ends of the arms being affixed to the part D. The said annulus and its series of arms are stamped from a single plate of metal, and swaged into shape, as shown in Figs. 3 and 4. By this peculiar construction and connection of the parts the cone is not only firmly secured in position, but the connections are so disposed as to offer but slight obstructions to the entering currents of air, or to the free radiation of the light. From the base of the cone or air-deflector F, or the part f, an annular flanch, a, extends downward at a right angle, and is provided with a series of air-inducts, b. The main purpose of this flanch, which is to be formed of a diameter to correspond with that of the throat of the chimney used, is to steady the chimney, and, by friction against the throat of the same, to hold the chimney down upon its seat. This flanch may be of any desirable width so long as it preserves its correspondence in diameter with the throat of the chimney. By such construction that nice adjustment of the length of the chimneys below their throats is avoided. E is the chimney, which constitutes an essential element in my invention, the same being in external form like many in common use; the said chimney having a contracted neck, f', a short distance above its base, which is of a cylindrical or other proper shape, and is to rest upon the supporter D. The throat of the chimney is to be "ground" or formed to one fixed standard diameter, such corresponding with a fixed standard diameter of the flanch a of the deflector against which it is to rest. The throat of the chimney may be of a greater or less width, as may be desirable. By this construction of the throat of the chimney—viz., of one standard uniform size to fit the flanch a, as described—the chimney will be firmly supported upon its seat.

To adapt the lamp for use in railway cars or other vehicles where great vibration of the lamp takes place, I form on the outer perimeter of the cone, or the flanch a, one or more projections or studs, h, and also form in the throat of the chimney corresponding vertical grooves i, the same being to enable the cone or flanch a to enter the throat of the chimney. I also form on the upper edge of the perimeter of the throat, and on opposite sides of the grooves i, one or more inclines, k, as shown in Fig. 7, the same being to operate in conjunction with the said studs h. After the chimney has been located upon its seat, by simply turning the former either to the right or left the chimney may be secured with such a degree of firmness as to prevent any accidental displacement thereof.

Having described my invention, what I claim is as follows:

1. A glass lamp-chimney formed with a contracted neck, as described, when the throat thereof is formed or "ground" to one standard diameter, as and for the purpose set forth.

2. In combination with a glass lamp-chimney having a contracted neck and throat formed as described, a flanged cone or deflector, to extend up into and fit the throat, and by impingement against the perimeter thereof maintain the chimney upon its seat, as specified.

3. A glass lamp-chimney having a contracted neck and throat, as described, when provided with one or more inclines formed upon the superior internal edge of the throat, in manner and for the purpose set forth.

4. A glass lamp-chimney having a contracted neck and throat, as described, and provided with one or more inclines, as stated, in combination with the flanged base of the cone provided with one or more studs, as specified.

5. A glass lamp-chimney having a contracted neck and throat, as described, and provided with one or more vertical grooves to receive the studs h, as and for the purpose specified.

M. H. COLLINS.

Witnesses:
SIMON W. HATHEWAY,
CHARLES A. PHILLIPS.